(12) United States Patent
Wu et al.

(10) Patent No.: US 10,189,542 B2
(45) Date of Patent: Jan. 29, 2019

(54) BICYCLE REAR DERAILLEUR

(71) Applicant: LEE CHI ENTERPRISES COMPANY LTD., Changhua (TW)

(72) Inventors: Shan-Lin Wu, Changhua (TW); Yuan-Ji Lin, Taichung (TW); Yu-Hung Pan, Changhua (TW)

(73) Assignee: LEE CHI ENTERPRISES COMPANY LTD., Changhua (TW)

( * ) Notice: Subject to any disclaimer, the term of this patent is extended or adjusted under 35 U.S.C. 154(b) by 202 days.

(21) Appl. No.: 15/378,403

(22) Filed: Dec. 14, 2016

(65) Prior Publication Data

US 2017/0174289 A1   Jun. 22, 2017

(30) Foreign Application Priority Data

Dec. 18, 2015 (TW) .............................. 104142650 A (51) Int. Cl.
   B62M 9/1242 (2010.01)

(52) U.S. Cl.
   CPC ................................. B62M 9/1242 (2013.01)

(58) Field of Classification Search
   CPC ...... B62M 9/122; B62M 25/08; B62M 9/126; B62M 9/12; B62K 23/04
   USPC .................................................... 474/80, 82
   See application file for complete search history.

(56) References Cited

U.S. PATENT DOCUMENTS

| | | | | |
|---|---|---|---|---|
| 5,295,916 A * | 3/1994 | Chattin | .................. | B62M 9/123 474/78 |
| 6,135,904 A * | 10/2000 | Guthrie | .................. | B62M 9/122 474/82 |
| 7,563,186 B2 * | 7/2009 | Mercat | ..................... | B62M 9/12 474/70 |
| 8,202,182 B2 * | 6/2012 | Ishikawa | .............. | B62M 9/1248 192/226 |
| 8,277,346 B2 * | 10/2012 | Watarai | .................. | B62M 9/126 474/82 |
| 8,852,041 B2 * | 10/2014 | Yamaguchi | ............ | B62M 9/126 474/80 |
| 8,870,692 B2 * | 10/2014 | Yamaguchi | ............ | B62M 9/126 474/80 |
| 8,870,693 B2 * | 10/2014 | Shahana | ................ | B62M 9/121 474/80 |
| 8,882,618 B2 * | 11/2014 | Yamaguchi | ............ | B62M 9/122 474/80 |
| 8,900,078 B2 * | 12/2014 | Yamaguchi | .......... | B62M 9/1244 474/80 |

(Continued)

*Primary Examiner* — Henry Y Liu
(74) *Attorney, Agent, or Firm* — Tracy M. Heims; Apex Juris, PLLC.

(57) ABSTRACT

A bicycle rear derailleur is provided, which includes a base adapted to be mounted on a bicycle frame, a movable member, a linkage assembly pivotally connected to and between the base and the movable member, a pivot shaft provided within and pivotally rotatable relative to the movable member, a chain guide fixed to an end of the pivot shaft, a restriction assembly provided on the pivot shaft, and a friction assembly provided within the movable member to provide a rotational friction on the restriction assembly. Whereby, the chain guide is pivotally awing toward a first direction by a force; when the chain guide swings toward a second direction which is opposite to the first direction by another force, it is forced by a swing resistance.

10 Claims, 8 Drawing Sheets

(56) References Cited

U.S. PATENT DOCUMENTS

| | | | | |
|---|---|---|---|---|
| 8,974,331 B2* | 3/2015 | Yamaguchi | ............ | B62M 9/122 |
| | | | | 474/80 |
| 9,005,059 B2* | 4/2015 | Suyama | ................ | B62M 9/122 |
| | | | | 474/80 |
| 9,033,833 B2* | 5/2015 | Johnson | .................. | F16H 9/06 |
| | | | | 474/80 |
| 9,120,530 B2* | 9/2015 | Yamaguchi | ............ | B62M 9/126 |
| 9,187,149 B2* | 11/2015 | Yamaguchi | ............ | B62M 9/126 |
| 9,227,696 B2* | 1/2016 | Yamaguchi | ............ | B62M 9/126 |
| 9,228,643 B2* | 1/2016 | Yamaguchi | ............ | F16H 7/1227 |
| 9,290,235 B2* | 3/2016 | Yamaguchi | .......... | B62M 9/1244 |
| 9,303,763 B2* | 4/2016 | Yamaguchi | ............ | F16H 61/68 |
| 9,327,792 B2* | 5/2016 | Johnson | ................ | B62M 9/124 |
| 9,463,846 B2* | 10/2016 | Chang | .................. | B62M 9/121 |
| 9,669,900 B2* | 6/2017 | Shirai | ...................... | B62M 9/16 |
| 9,751,590 B2* | 9/2017 | Shipman | ............... | B62M 9/126 |
| 9,944,350 B2* | 4/2018 | Braedt | .................. | B62M 9/122 |

\* cited by examiner

BICYCLE REAR DERAILLEUR

BACKGROUND OF THE INVENTION

1. Technical Field

The present invention relates generally to a bicycle rear derailleur, and more particularly to a bicycle rear derailleur capable of stabilizing the tension of the chain.

2. Description of Related Art

In general, a bicycle rear derailleur mainly includes a base, a movable member, and a chain guide. The base is mounted on the rear of a bicycle frame, and near a cassette. The movable member is connected to the base through a linkage assembly in a movable manner. The chain guide can be controlled to shift among multiple sprockets, whereby to either guide the chain to move on a specific sprocket, or switch the chain from one sprocket to another.

The chain guide is normally pivotally connected to the movable member, and is rotatable relative to the movable member. In addition, the chain guide is able to be rotated clockwise (if seen from the right side of the bicycle) by an elastic bias of a biasing element. In this way, when the chain is shifted from one sprocket with a larger diameter to another sprocket with a smaller diameter, the chain guide can provide a tension to tighten the chain.

However, while moving on a rough road surface with bumps or potholes, the chain may be shaken due to the bump or sudden vibration, and thus pull the chain guide to rotate counterclockwise. In such conditions, the tension of the chain would be reduced, which makes the chain become too loose to stably mesh with the sprocket. As a result, the loosened chain may be switched from one sprocket to another sprocket unintentionally. In a worst case, the chain may even be detached from the sprocket, giving the cyclist an unpleasant riding experience.

BRIEF SUMMARY OF THE INVENTION

In view of the above, the primary objective of the present invention is to provide a bicycle rear derailleur which ensures the chain would not be loose, and to enhance the safety for cycling.

The present invention provides a bicycle rear derailleur, which is adapted to be mounted on a bicycle frame, including a parallel linkage mechanism, a pivot shaft, a chain guide, a restriction assembly, and a friction assembly. The parallel linkage mechanism includes a base, a linkage assembly, and a movable member. The base is adapted to be mounted on the bicycle frame. The linkage assembly is pivotally connected to and between the base and the movable member in a way that the movable member is movable relative to the base. The movable member has a chamber. The pivot shaft is provided within the chamber, wherein the pivot shaft is pivotally rotatable relative to the movable member. The chain guide is fixed to the pivot shaft. The restriction assembly includes a first ratchet gear, a second ratchet gear, and an elastic member. The first ratchet gear fits around the pivot shaft, and is not rotatable relative to the pivot shaft; the second ratchet gear rotatably fits around the pivot shaft, and teeth thereof match teeth of the first ratchet gear. The elastic member is provided within the chamber with an end thereof abutting against either the first ratchet gear or the second ratchet gear to keep the first ratchet gear and the second ratchet gear contacting with each other. The friction assembly is provided within the chamber to provide a rotational friction on the second ratchet gear. Whereby, when the chain guide swings toward a first direction by a force, the pivot shaft and the first ratchet gear are driven to rotate toward the first direction, and the teeth of the first ratchet gear and the teeth of the second ratchet gear are disengaged from each other, so that the first ratchet gear and the second ratchet gear are relatively rotatable. When the chain guide swings toward a second direction which is opposite to the first direction by another force, the teeth of the first ratchet gear and the teeth of the second ratchet gear restrict each other, so that the first ratchet gear and the second ratchet gear are not relatively rotatable.

Whereby, with the rotational friction to the restriction assembly by the friction assembly, and the actions of the ratchet gears of the restriction assembly, the chain guide is allowed to swing toward the first direction. When the chain guide swings toward the second direction which is opposite to the first direction, a swing resistance is generated. Therefore, the chain guide provides a stable tension to the chain during a riding process, which ensures the chain would not be detached unintentionally.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
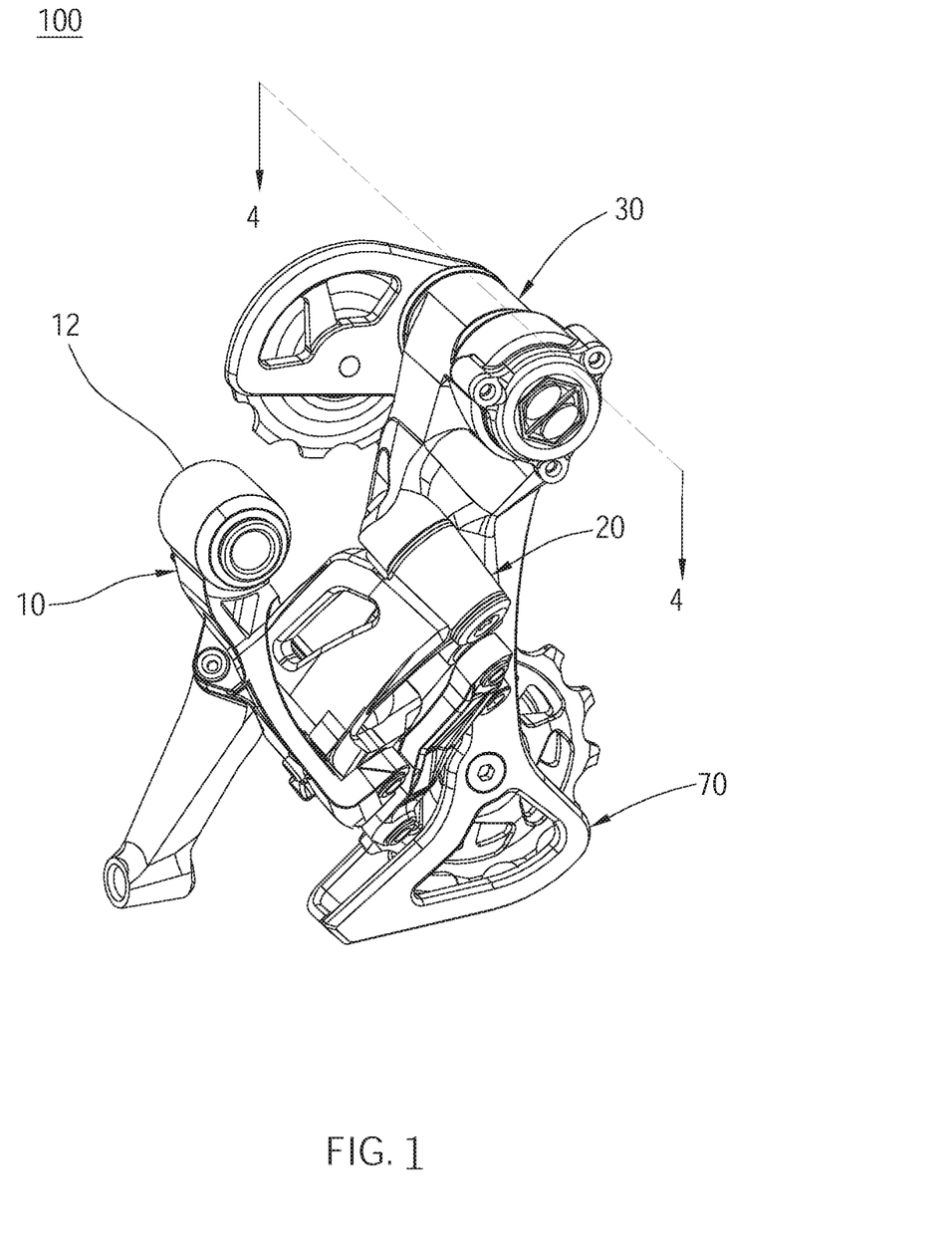
FIG. 1 is a perspective view of a first embodiment of the present invention, showing the bicycle rear derailleur.
Figure 2:
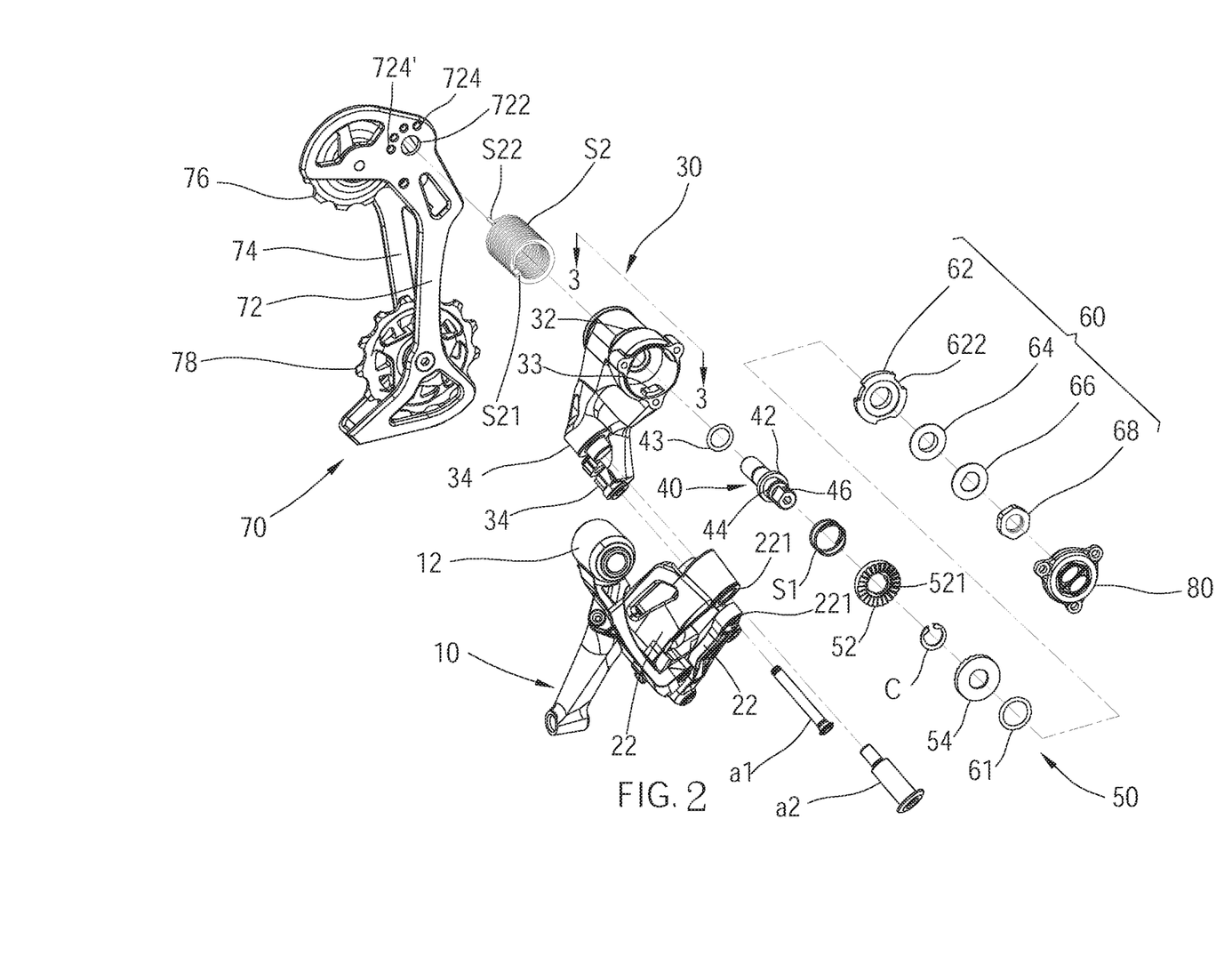
FIG. 2 is an exploded view of the bicycle rear derailleur in FIG. 1.

As shown in FIG. 1 and FIG. 2, a bicycle rear derailleur 100, the first embodiment of the present invention, includes a parallel linkage mechanism which includes a base 10, a linkage assembly 20, and a movable member 30. The bicycle rear derailleur 100 further includes a pivot shaft 40, a restriction assembly 50, a friction assembly 60, and a chain guide 70.

The base 10 has a mounting portion 12 which is fixed to the rear of a bicycle frame by fasteners such as screws or bolts, and near a side of the sprockets. Additionally, the base 10 can be used as a fixed link of the parallel linkage mechanism.

The linkage assembly 20 includes two connecting rods 22, wherein each of the connecting rods 22 has an end pivotally connected to the base 10, and another end thereof has a pivot hole 221.

Figure 3:
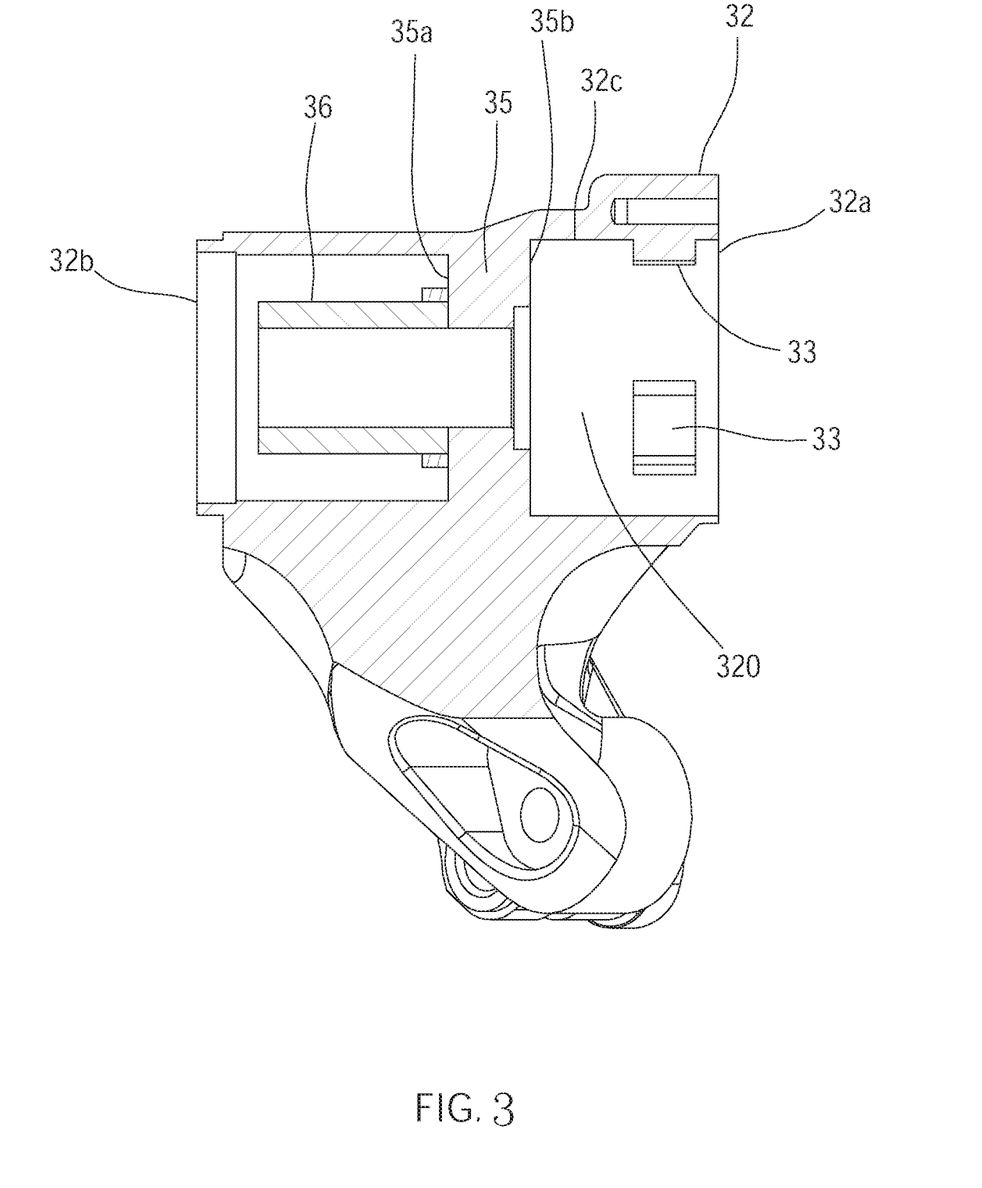
FIG. 3 is a sectional view along the 3-3 line in FIG. 2.

The movable member 30 includes a main body 32 and two pivot portions 34 connected to the main body 32. As shown in FIG. 2 and FIG. 3, the main body 32 has a chamber 320 therein, and two openings 32a and 32b communicating the chamber 320 respectively formed at two ends of the main body 32. Three protrusions 33 are protruded from the inner surface 32c of the chamber 320 near the opening 32a, and are spaced from each other. A circular protruded ring 35 is protruded from the inner surface 32c of the chamber 320, and further has a cylindrical portion 36 protruded from a surface 35a facing the opening 32b. The movable member 30 can be used as floating link of the parallel linkage mechanism. The two pivot portions 34 are corresponding and pivotally fixed to the pivot holes 221 of the connecting rods 22 by two positioning shafts a1 and a2 respectively, so that the movable member 30 is movable relative to the base 10 on a plane which is parallel to a plane formed by the base 10.

Figure 4:
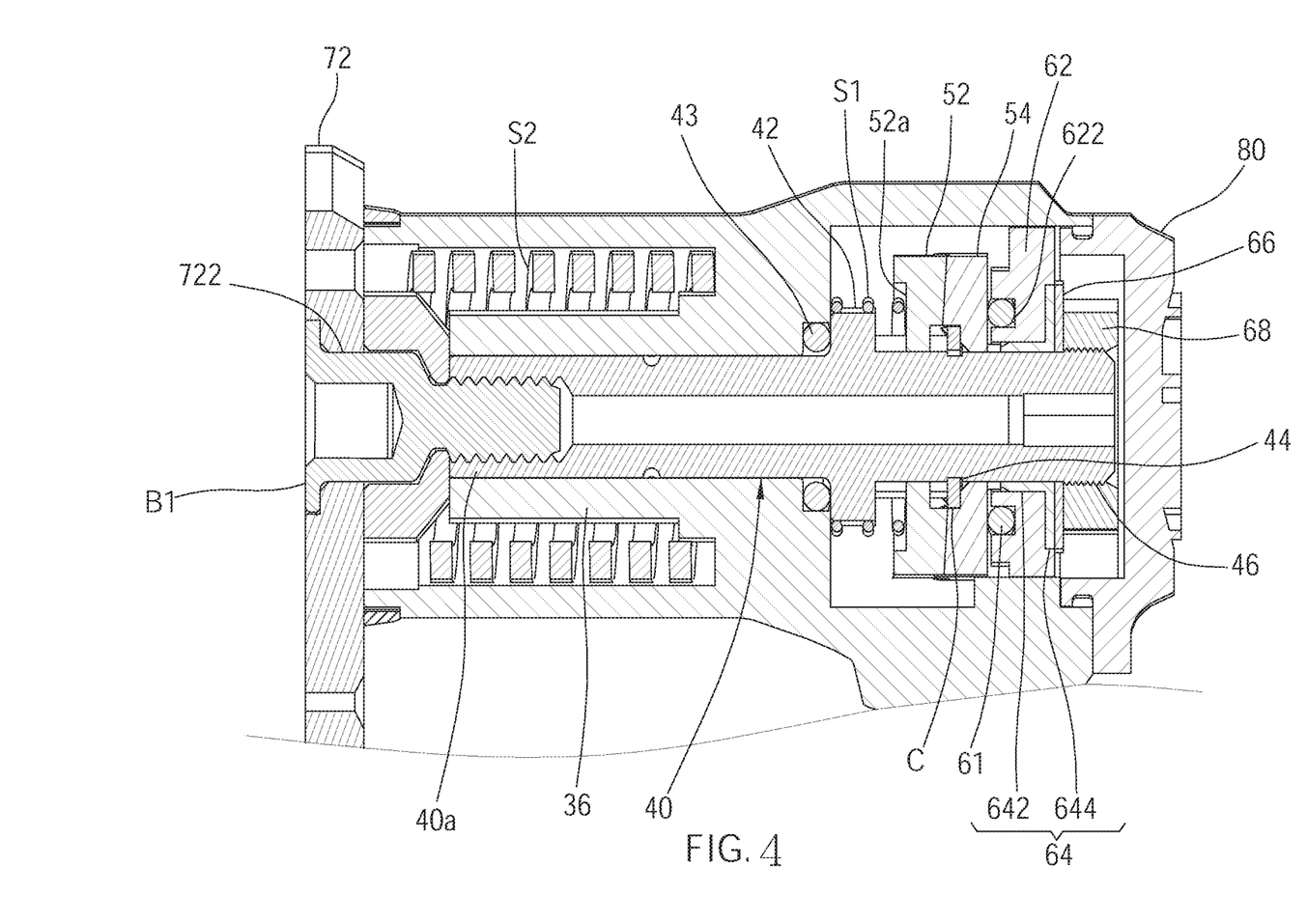
FIG. 4 is a sectional view along the 4-4 line in FIG. 1.

A protruded ring 42, a circular groove 44, and a thread section 46 are sequentially formed on the outer surface of the pivot shaft 40 in the axial direction. The pivot shaft 40 is inserted from the opening 32a of the main body 32, and is provided within the chamber 320 of the main body 32. The pivot shaft 40 is pivotally rotatable relative to the main body 32. As illustrated in FIG. 3 and FIG. 4, the protruded ring 42 of the pivot shaft 40 abuts against another surface 35b of the protruded ring 35 of the main body 32. In addition, a washer 43 made of rubber or silicone is provided between the protruded ring 42 and the another surface 35b for preventing leakage of fluid such as a lubricant, along the pivot shaft 40, and for providing a sealing effect against water and dust.

The restriction assembly 50 includes a first elastic member S1, a first ratchet gear 52, a c-shaped ring C, and a second ratchet gear 54. The first elastic member S1 fits around the pivot shaft 40, and abuts against the another surface 35b of the protruded ring 35 with an end. The first ratchet gear 52 fits around the pivot shaft 40, and is not rotatable relative to the pivot shaft. Moreover, the first ratchet gear 52 is provided between the protruded ring 42 and the circular groove 44, wherein an end surface 52a of the first ratchet gear 52 abuts against another end of the first elastic member S1, and is pushed by the elastic force of the first elastic member S1. A projected ring 521 is protruded from the inner surface of the first ratchet gear 52. In this embodiment, the first elastic member S1 is a compressed spring, while in other embodiments, the first elastic member S1 is not limited to the compressed spring.

In this embodiment, two flat surfaces are formed on the inner surface of the first ratchet gear 52, and the pivot shaft 40 has two flat surfaces facing the two flat surfaces of the first ratchet gear 52. When the first ratchet gear 52 fits around the pivot shaft 40, the two flat surfaces of the pivot shaft 40 abut against the two flat surfaces of the first ratchet gear 52 respectively, so that the first ratchet gear 52 is not rotatable relative to the pivot shaft 40. In other embodiments, the first ratchet gear has a notch recessed into the inner surface thereof, while the pivot shaft has a protruded rib formed on the outer surface thereof, wherein the axis of the protruded rib is parallel to the axis of the pivot shaft. Accordingly, when the first ratchet gear fits around the pivot shaft, the protruded rib engages the notch to restrict the first ratchet gear to rotate relative to the pivot shaft.

The c-shaped ring C is fixed in the circular groove 44 of the pivot shaft 40, and abuts against the projected ring 521 of the first ratchet gear 52 to prevent the first ratchet gear 52 from disengaged from the pivot shaft 40 along the axial direction of the pivot shaft 40. Or, the c-shaped ring C abuts against the second ratchet gear 54 to restrict the moving of the second ratchet gear 54 on the pivot shaft 40 along the axial direction of the pivot shaft 40. The second ratchet gear 54 fits around the pivot shaft 40, and is rotatable relative to the pivot shaft 40. At the side of the circular groove 44 away from the protruded ring 42, the teeth of the second ratchet gear 54 face the teeth of the first ratchet gear 52. In addition, the elastic force provided by the elastic member S1 can keep the first ratchet gear 52 and the second ratchet gear 54 contacting with each other.

The friction assembly 60 fits around the pivot shaft 40, and is provided within the chamber 320. In this embodiment, the friction assembly 60 includes, in accordance with the assembly sequence, a friction plate 62, a shaft liner 64, a washer 66, and a nut 68.

The friction plate 62 is circular, and has three notches 622 recessed into the peripheral surface thereof, wherein the notches are spaced from each other. The sizes of the notches 622 are corresponding to the sizes of the protrusions 33 of the main body 32 of the movable member 30. Therefore, when the friction plate 62 and the main body 32 are connected, the protrusions 33 are fitted into the notches 622 respectively to block the friction plate 62 from rotating relative to the movable member 30. The friction plate 62 abuts against an end surface 54a of the second ratchet gear 54, and can provide a pressure (force) along the axial direction of the pivot shaft 40 to the second ratchet gear 54 toward the first ratchet gear 52, and can also provide a rotational friction to the second ratchet gear 54 to restrict the second ratchet gear 54 to rotate relative to the main body 32. Additionally, a circular groove 622 is formed on an end surface of the friction plate 62 facing the second ratchet gear 54. An O-ring 61 is provided in the circular groove 622, and between the friction plate 62 and the second ratchet gear 54 to additionally enhance the rotational friction to the second ratchet gear 54.

The shaft liner 64 has a sleeve portion 642 and a ring portion 644 connected together. The sleeve portion 642 is provided between the outer surface of the pivot shaft 40 and the inner surface of the friction plate 62. An end surface of the ring portion 644 leans against another end surface of the friction plate 62. The shaft liner 64 is made of a material having a low friction coefficient to reduce the friction loss between the pivot shaft 40 and the friction plate 62.

After the washer 66 fits around the pivot shaft 40, the nut 68 is then screwed onto the thread section 46 of the pivot shaft 40 to push and press the washer 66, the shaft liner 64, the friction plate 62, and the second ratchet gear 54 together, and thus to provide the pressure to the second ratchet gear 54 along the axial direction of the pivot shaft 40 toward the first ratchet gear 52, and the rotational friction. Furthermore, the first elastic member S1 provides an elastic force, i.e., a pressure, to the first ratchet gear 52 toward the second ratchet gear 54, to keep the teeth between the first ratchet gear 52 and the second ratchet gear 54 contacting. In addition, in another embodiment, the first elastic member can provide an elastic force to the second ratchet gear to form a pressure toward the first ratchet gear, so as to keep the teeth between the first ratchet gear 52 and the second ratchet gear 54 contacting.

In addition, the depth of the nut 68 screwed onto the thread section 46 of the pivot shaft 40 is freely adjustable according to a predetermined pressure by users. If the depth of the nut 68 screwed onto the thread section 46 is greater, the pressure on the second ratchet gear 54 would be larger, and the teeth between the second ratchet gear 54 and the first ratchet gear 52 would be in mesh tighter and stronger. In contrast, if the depth is smaller, the pressure on the second ratchet gear 54 would be smaller, and the teeth between the second ratchet gear 54 and the first ratchet gear 52 would be in mesh looser and weaker.

Next, an end cap 80 is fixed on the opening 32a of the main body 32 to close the opening 32a to prevent foreign matters such as dust, water vapor, muddy water and the like from entering the main body 32.

The chain guide 70 includes a first cage plate 72, a second cage plate 74, a guide pulley 76, and a tensioning pulley 78. The first cage plate 72 and the second cage plate 74 are arranged side by side. The guide pulley 76 and the tensioning pulley 78 are pivotally connected to and between the first and second cage plates 72 and 74, wherein the two pulleys 76 and 78 are supported by the two cage plates 72 and 74, and are rotatable. The first cage plate 72 has a through hole 722 and a plurality of positioning holes 724 formed around the through hole 722. The first cage plate 72 is fixed to the pivot shaft 40 through a bolt B1, wherein the treaded rod of the bolt B1 passes through the through hole 722, and is threaded on a thread section 40a on the inner surface of the pivot shaft 40. The head of the bolt B1 abuts against a side of the first cage plate 72. Therefore, the chain guide 70 and the pivot shaft 40 are able to rotate synchronously.

Moreover, a second elastic member S2 is provided into the main body 32, and fits around the outer surface of the cylindrical portion 36. The second elastic member S2 has two free ends S21 and S22. The free end S21 is fixedly inserted in a notch (not shown) formed on the surface 35a of the protruded ring 35; the free end S22 is inserted in one of the positioning holes 724. Whereby, the second elastic member S2 provides an elastic bias to the chain guide 70 to make the chain guide 70 rotate clockwise or counterclockwise. In this embodiment, the second elastic member S2 is a torsion spring, while in other embodiments, the second elastic member S2 is not limited to the torsion spring.

Especially, the positioning holes 724 are arranged on different radial extensions of the through hole 722, and thus the initial angular position of the chain guide 70 relative to the movable member 30 can be altered by inserting the second elastic member S2 into different positioning holes 724. For example, if the free end S22 of the second elastic member S2 is inserted in the right-most positioning hole 724, the chain guide 70 is approximately arranged at six o'clock position; if the free end S22 of the second elastic member S2 is inserted in the left-most positioning hole 724, the chain guide 70 is approximately arranged at eight o'clock position. In this way, the chain guide 70 is adjustable by users depending on the diameter of the different sprockets of the bicycle, the number of the sprockets, the length of the chain, or the predetermined bias strength forced to chain guide.

Figure 5:
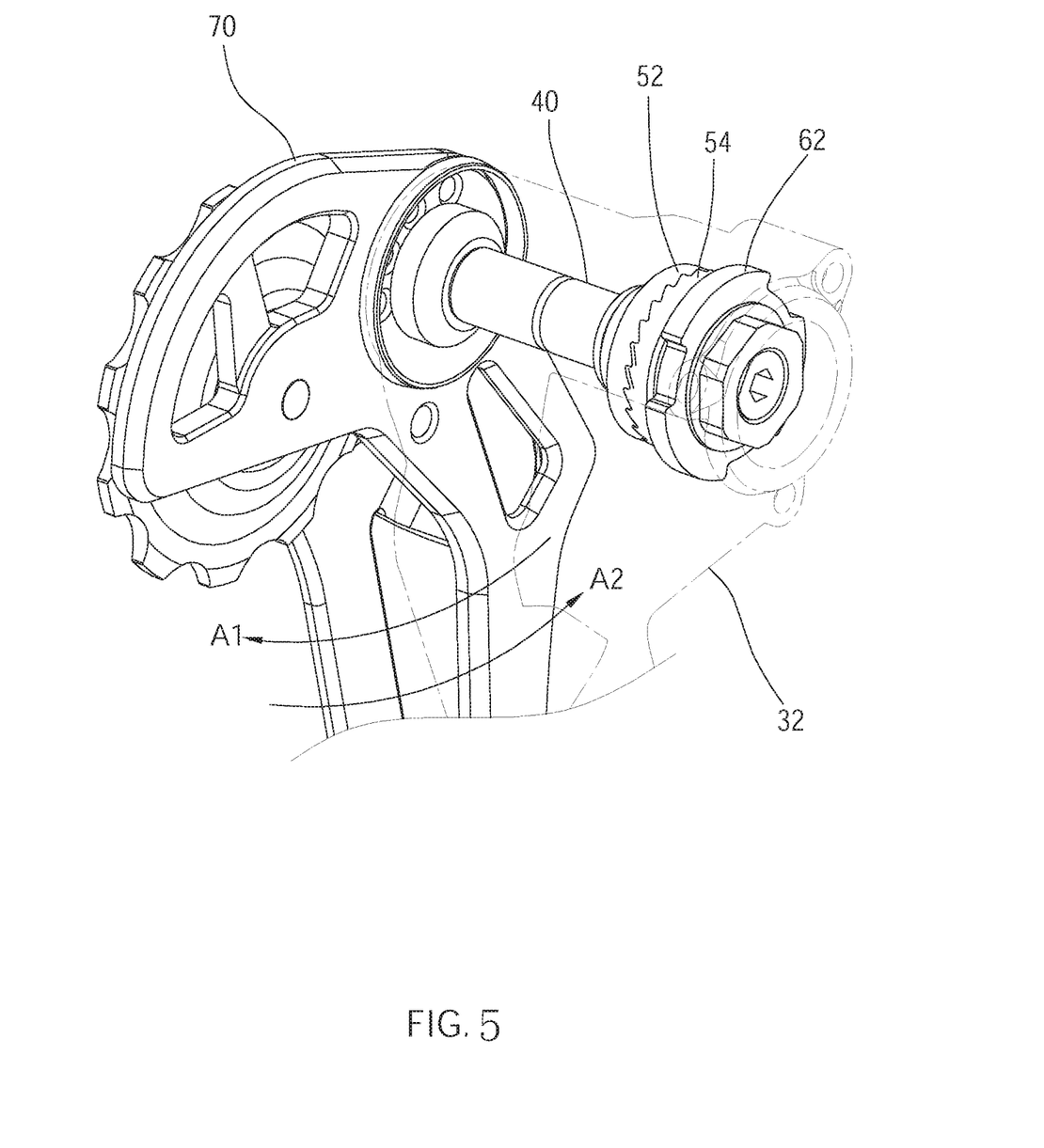
FIG. 5 is a partially enlarged view of the first embodiment, showing the chain guide, pivot shaft, first ratchet gear, and second ratchet gear, wherein the main body of the movable member is represented by the phantom line.

As depicted in FIG. 5, the movable member 30 and the second elastic member S2 are hidden with the phantom line. It is understood that when the chain is switched from a sprocket with larger diameter to a sprocket with smaller diameter, and at the time that the chain guide 70 is forced by the second elastic member S2, the chain guide 70 is able to be rotated clockwise (in a first direction A1) to tighten the chain. Additionally, when the chain guide 70 is rotated in the first direction A1, the pivot shaft 40 and the first ratchet gear 52 are driven to be synchronously rotated in the first direction A1, and the teeth of the first ratchet gear 52 and the teeth of the second ratchet gear 54 are disengaged from each other, so that the first ratchet gear 52 and the second ratchet gear 54 are relatively rotatable. In more details, the bevels of the teeth of the first ratchet gear 52 are driven by the pivot shaft 40 to slide forward along the bevels of the teeth of the second ratchet gear 54. When the bevels of the teeth slide relatively, the first ratchet gear 52 moves axially toward the first elastic member S1 to compress the first elastic member S1 because the side of the second ratchet gear 54 has no compression space. Then, after the bevels of the teeth of the first ratchet gear 52 slides to the end of the bevels of the teeth of the second ratchet gear 54, the first elastic member S1 axially pushes the first ratchet gear 52 toward the second ratchet gear 54, which makes each of the teeth of the first ratchet gear 52 re-engaged with another one of teeth of the second ratchet gear 54.

With the design of the teeth mentioned above, when the chain guide 70 is forced by another force (e.g., pull by the shaken chain due to the bump or sudden vibration while the bicycle is moving on a rough road surface), and is rotated counterclockwise (in a second direction A2), the teeth of the first ratchet gear 52 and the teeth of the second ratchet 54 restrict each other, so that the first ratchet gear 52 and the second ratchet gear 54 are not relatively rotatable. Furthermore, properly adjustment in the pressure and the rotational friction to the second ratchet gear 54 provided by the friction assembly 60 can ensure that the chain would not loose unintentionally. For example, the force applied to the second ratchet gear 54 by the friction assembly 60 can be adjusted to be slightly larger than the aforementioned pull at the chain guide 70. Accordingly, the second ratchet gear 54 fails to overcome the maximum static friction with the friction plate 62, and is not rotatable relatively, which ensures that the chain guide 70 would not swing toward the second direction A2 because the teeth of the first and the second ratchet gears are strongly engaged.

In this way, with the function of the restriction assembly 50 and the friction assembly 60, the bicycle rear derailleur 100 ensures that the chain guide 70 would not swing toward the second direction A2. Therefore, the tensioning pulley 78 of the chain guide 70 would always provide sufficient tension to the chain, which keeps the chain stably in a tightened state, as well as eliminates the risk of unexpected chain detachment.

Moreover, it is noticed that the aforementioned force applied to the second ratchet gear 54 by the friction assembly 60 has to be less than a predetermined value. Whereby, when the chain is switched from a sprocket with a smaller diameter to a sprocket with a larger diameter, the chain tightening force to the chain guide 70 is sufficient to simultaneously rotate the pivot shaft 40, the first ratchet gear 52 and the second ratchet gear 54 in the second direction A2, and to overcome the maximum static friction force between the second ratchet gear 54 and the friction plate 62. Thus, the chain guide 70 swings toward the second direction A2 to keep providing the chain an appropriate tension. In addition, the predetermined value is set based on the actual size of the bike, chain weight, and other factors.

Figure 6:
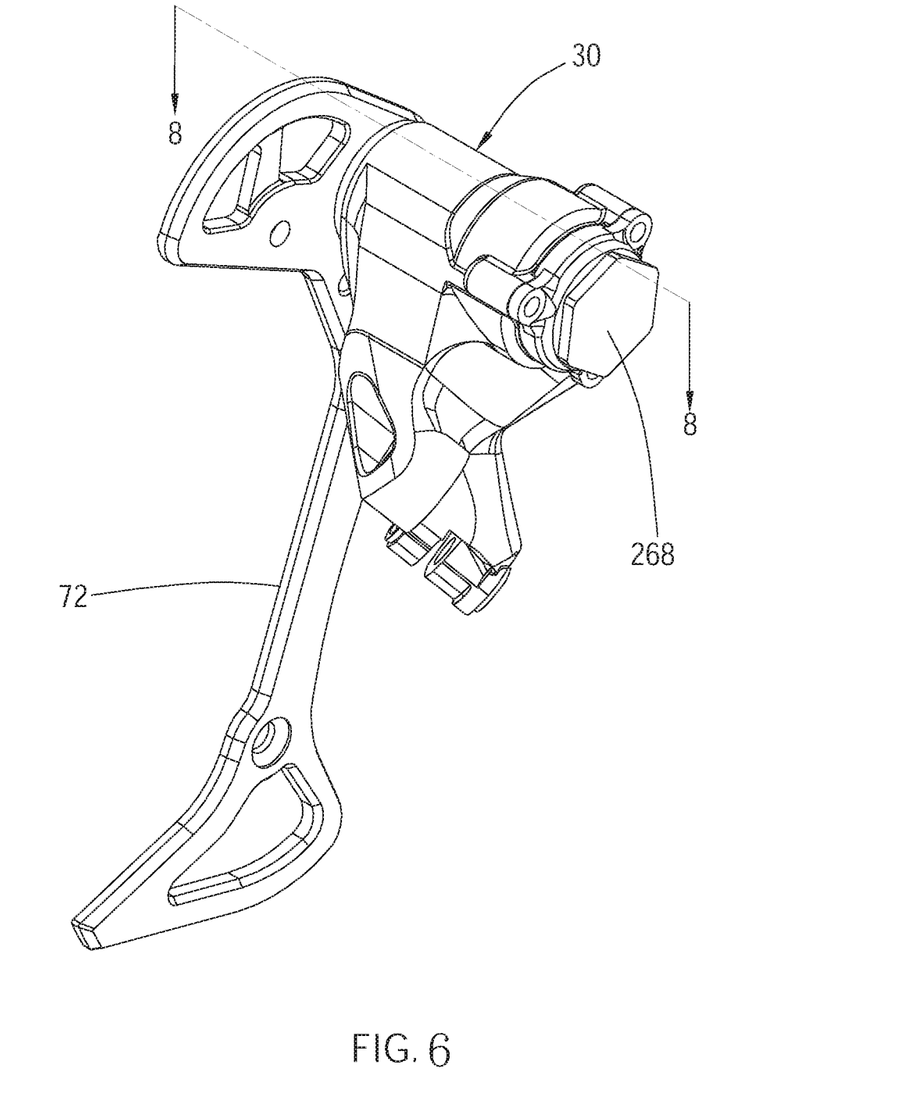
FIG. 6 is a perspective view of a second embodiment of the present invention, showing the bicycle rear derailleur.
Figure 7:
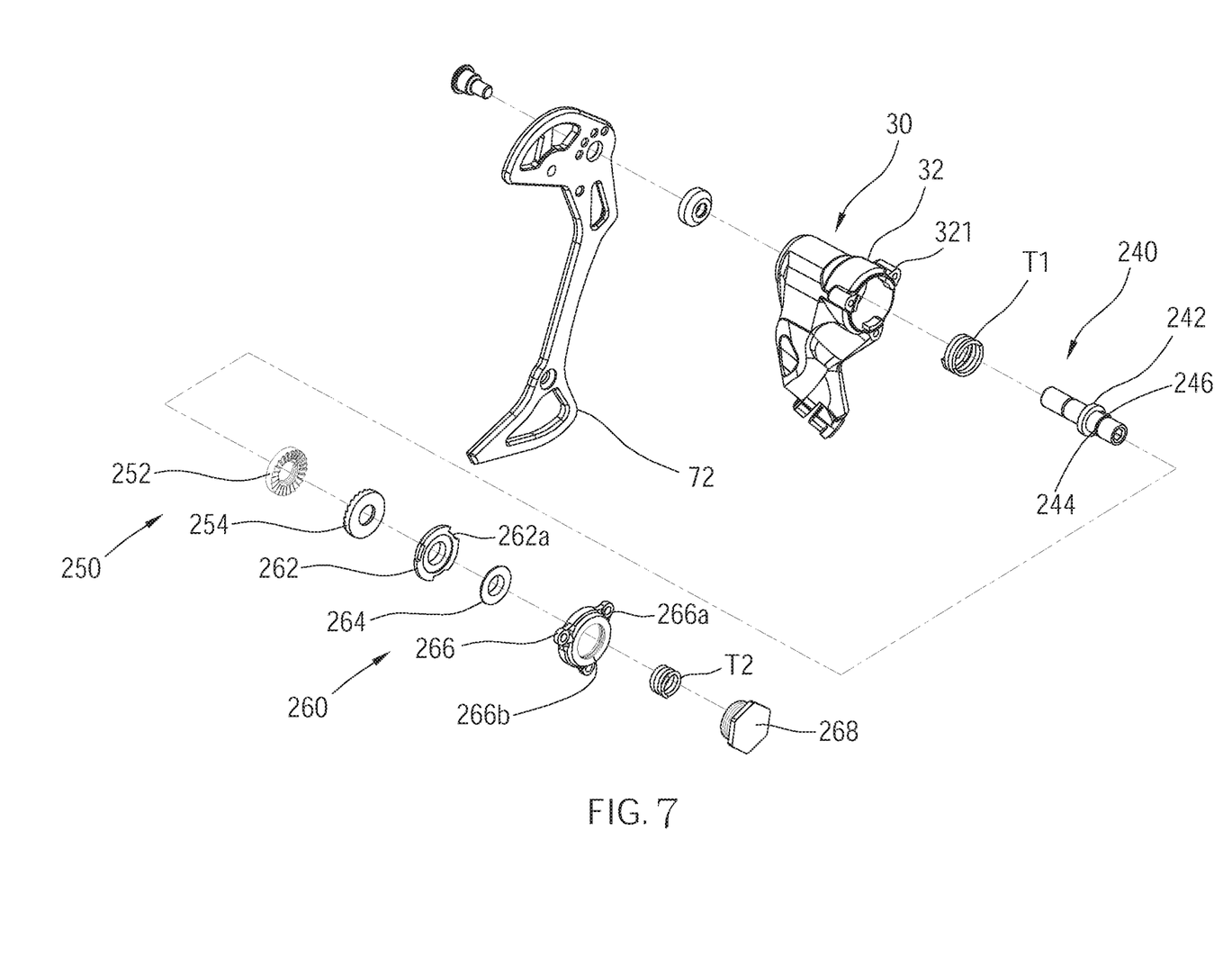
FIG. 7 is an exploded view of the bicycle rear derailleur in FIG. 6.
Figure 8:
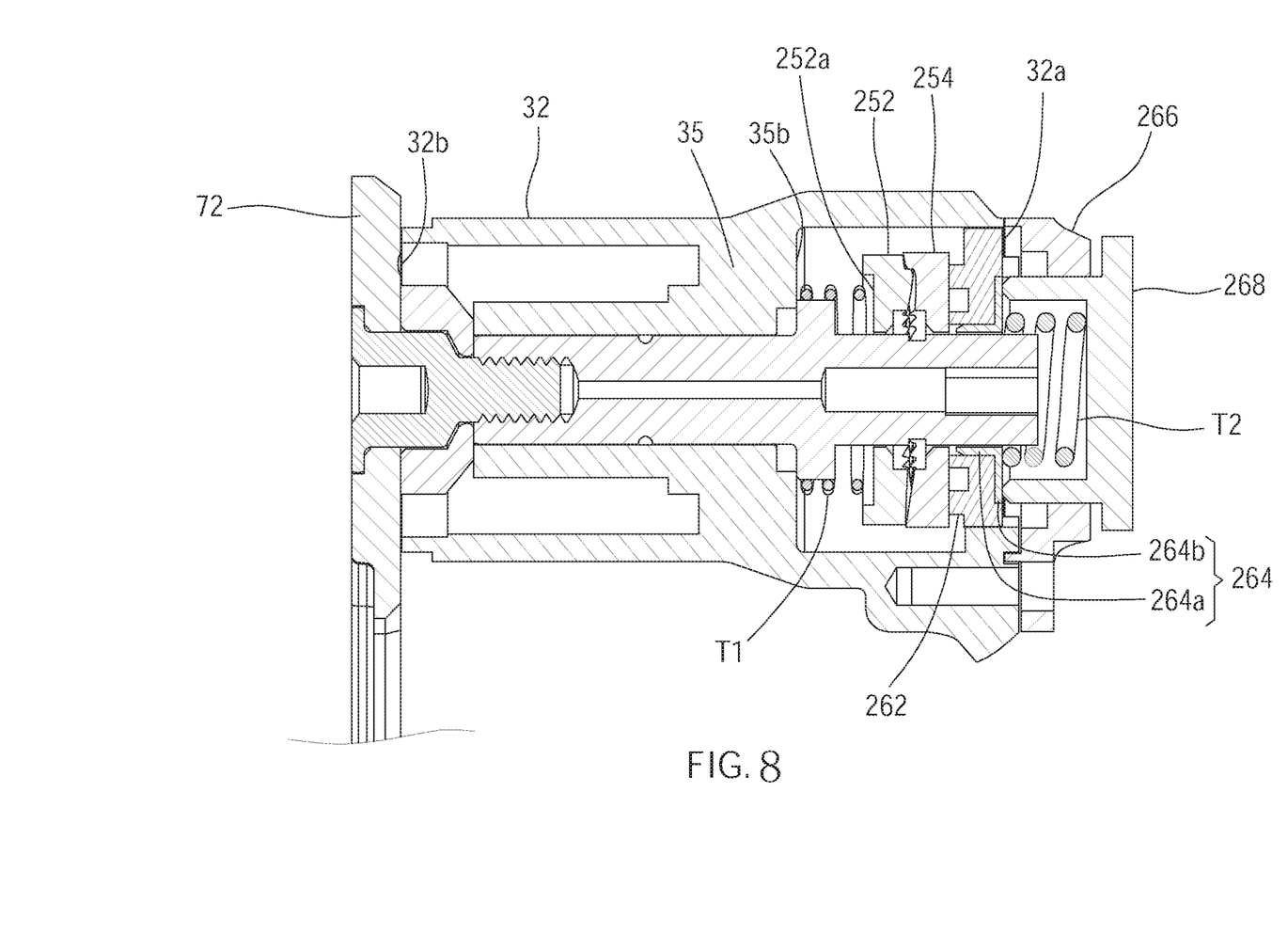
FIG. 8 is a sectional view along the 8-8 line in FIG. 6.

As shown in FIG. 6 to FIG. 8, the second embodiment, the bicycle rear derailleur 200, includes the base 10, the linkage assembly 20, the movable member 30, and the chain guide 70, which are the same in the first embodiment. In addition, the bicycle rear derailleur 200 also includes a pivot shaft 240, a restriction assembly 250, and a friction assembly 260.

A protruded ring 242 and a circular groove 244 are sequentially formed on the outer surface of the pivot shaft 240 in the axial direction, and a protruded rib 246 is formed between the protruded ring 242 and the circular groove 244. The pivot shaft 240 is inserted from the opening 32a of the movable member 30, and is provided within the main body 32. The pivot shaft 240 is pivotally rotatable relative to the main body 32. The protruded ring 242 of the pivot shaft 240 abuts against another surface 35b of the protruded ring 35 of the main body 32.

The restriction assembly 250 includes a first elastic member T1, a first ratchet gear 252, and a second ratchet gear 254. The first elastic member T1 fits around the pivot shaft 240, and abuts against the another surface 35b of the protruded ring 35 with an end. A slot (not shown) is formed on the inner surface of the first ratchet gear 252 in the axial direction. When the first ratchet gear 252 fits around the pivot shaft 240, and between the protruded ring 242 and the circular groove 244, the protruded rib 246 engages the slot to makes the first ratchet gear 252 fixed on the pivot shaft 240, and thus to prevent the first ratchet gear 252 from being rotated relative to the pivot shaft 240. An end surface 252a of the first ratchet gear 252 abuts against another end of the first elastic member T1, and is pushed by the elastic force of the first elastic member T1. In this embodiment, the first elastic member T1 is a compressed spring, while in other embodiments, the first elastic member T1 is not limited to the compressed spring.

The second ratchet gear 254 fits around the pivot shaft 240 in a rotatable way relative to the pivot shaft 240. The teeth of the second ratchet gear 254 mesh with the teeth of the first ratchet gear 252.

The friction assembly 260 includes a friction plate 262, a shaft liner 264, a fixing ring 266, a second elastic member T2, and an adjusting knob 268.

The friction plate 262 is circular, and has three notches 262a recessed into the peripheral surface thereof, wherein the notches are spaced from each other. The notches 262a are corresponding to the protrusions 33 of the main body 32 of the movable member 30. Therefore, when the friction plate 262 and the main body 32 are connected, the protrusions 33 are fitted into the notches 262a respectively to block the friction plate 262 from rotating relative to the movable member 30. In addition, the friction plate 262 provides a rotational friction to the second ratchet gear 254.

The shaft liner 264 has a sleeve portion 264a and a ring portion 264b connected together. The sleeve portion 264a is provided between the outer surface of the pivot shaft 240 and the inner surface of the friction plate 262. An end surface of the ring portion 264b leans against another end surface of the friction plate 262. The shaft liner 264 is made of a material having a low friction coefficient to reduce the friction loss between the pivot shaft 240 and the friction plate 262.

The fixing ring 266 has three through holes 266a which are aligned with the screw holes 321 of the main body 32 screw hole 321. A fastener passes through each pair of the through hole 266a and the screw hole 321 to fix the fixing ring 266 at the opening 32a of the main body 32. Additionally, a thread section 266b is formed on the inner surface of the fixing ring 266.

The second elastic member T2 fits around an end of the pivot shaft 240, and an end thereof abuts against the ring portion 264b of the shaft liner 264. The adjusting knob 268 is threaded on the thread section 266b of the fixing ring 266 with a thread section on the cylinder thereof. Moreover, an end surface of the adjusting knob 268 abuts against another end of the second elastic member T2. In addition, the depth of the adjusting knob 268 screwed into the fixing ring 266 determines the pressure forced to the shaft liner 264, the friction plate 262, and the second ratchet gear 254. For example, if the depth of the adjusting knob 268 screwed into the fixing ring 266 is greater, the pressure on the second ratchet gear 254 would be larger, and the teeth between the second ratchet gear 254 and the first ratchet gear 252 would be in mesh tighter and stronger. In contrast, if the depth is smaller, the pressure on the second ratchet gear 254 would be smaller, and the teeth between the second ratchet gear 254 and the first ratchet gear 252 would be in mesh looser and weaker. In this embodiment, the second elastic member T2 is a compressed spring, while in other embodiments, the second elastic member T2 is not limited to the compressed spring.

The operational mechanism of the first ratchet gear 252, second ratchet gear 254, the pivot shaft 240, and the chain guide 70 is roughly the same as that in the first embodiment, and can also achieve the same effect that not only allows the chain guide swinging toward the clockwise direction to tighten the chain, but also prevents the chain guide from swinging toward the counterclockwise direction unintentionally, which prevents the reduction of the tension to the chain by the chain guide and the detachment of the chain.

In addition, both the chain guides of the two abovementioned embodiments are the rear-swing type. In other words, with the design of the tooth direction of the teeth between the first ratchet gear and the second ratchet gear, the first ratchet gear can be disengaged from the second ratchet gear toward the clockwise direction relative to the second ratchet gear, which drives the chain guide to swing toward the clockwise direction (i.e., swing toward the rear of the bicycle) to tighten the chain. In other embodiments, the chain guide can be front-swing type through changing the direction of some components. For example, changing the tooth direction of the teeth between the first ratchet gear and the second ratchet gear makes the first ratchet gear detachable from the second ratchet gear in the counterclockwise direction relative to the second ratchet gear. In such way, the chain guide can swing toward the counterclockwise direction (i.e., swing toward the front of the bicycle) to tighten the chain. In this sense, when the chain guide swings toward the clockwise direction, it would also be forced by a swing resistance, which prevent the chain from being loose unintentionally.

Furthermore, the rotational friction is not limited to force on the second ratchet gear along the axial direction toward the first ratchet gear, but can be a pressure that forces on the first ratchet gear toward the second ratchet gear in other embodiments.

In addition, the friction assembly is mainly used to provide a rotational friction to the second ratchet gear, and can only be a friction plate, a friction structure, a bolt, or the combination thereof abutting against the second ratchet gear in other embodiments.

Additionally, the aforementioned first elastic member provides an elastic force to the first ratchet gear toward the second ratchet gear to keep the second ratchet gear and the first ratchet gear contacting with each other. While in other embodiments, an elastic member is provided to abut against the second ratchet gear with an end thereof to provide a force on the second ratchet gear to keep the second ratchet gear and the first ratchet gear contacting with each other.

It must be pointed out that the embodiments described above are only some preferred embodiments of the present invention. All equivalent structures which employ the concepts disclosed in this specification and the appended claims should fall within the scope of the present invention.

What is claimed is:

1. A bicycle rear derailleur, which is adapted to be mounted on a bicycle frame, comprising:
a parallel linkage mechanism, which comprises a base, a linkage assembly, and a movable member, wherein the base is adapted to be mounted on the bicycle frame; the linkage assembly is pivotally connected to and between the base and the movable member in a way that the movable member is movable relative to the base; the movable member has a chamber;

a pivot shaft provided within the chamber, wherein the pivot shaft is pivotally rotatable relative to the movable member;

a chain guide fixed around the pivot shaft;

a restriction assembly comprising a first ratchet gear, a second ratchet gear, and an elastic member, wherein the first ratchet gear fits around the pivot shaft, and is not rotatable relative to the pivot shaft; the second ratchet gear rotatably fits around the pivot shaft, and teeth thereof match teeth of the first ratchet gear; the elastic member is provided within the chamber with an end thereof abutting against either the first ratchet gear or the second ratchet gear to keep the first ratchet gear and the second ratchet gear contacting with each other; and a friction assembly provided within the chamber to provide a rotational friction on the second ratchet gear;

whereby, when the chain guide swings toward a first direction by a force, the pivot shaft and the first ratchet gear are driven to rotate toward the first direction, and the teeth of the first ratchet gear and the teeth of the second ratchet gear are disengaged from each other, so that the first ratchet gear and the second ratchet gear are relatively rotatable; when the chain guide swings toward a second direction which is opposite to the first direction by another force, the teeth of the first ratchet gear and the teeth of the second ratchet restrict each other, so that the first ratchet gear and the second ratchet gear are not relatively rotatable.

2. The bicycle rear derailleur of claim 1, wherein the friction assembly abuts against an end surface of the second ratchet gear; the end surface is opposite to the teeth of the second ratchet gear.

3. The bicycle rear derailleur of claim 2, wherein the friction assembly comprises a friction plate which is provided within the chamber; the friction plate abuts against the end surface of the second ratchet gear to provide the rotational friction on the second ratchet gear.

4. The bicycle rear derailleur of claim 3, wherein the friction assembly comprises an O-ring which is provided between the friction plate and the second ratchet gear to provide the rotational friction on the second ratchet gear.

5. The bicycle rear derailleur of claim 4, wherein the friction plate has a circular groove recessed into an end surface thereof facing the second ratchet gear; the O-ring is provided in the circular groove.

6. The bicycle rear derailleur of claim 3, wherein the friction plate has a plurality of notches formed on a peripheral surface thereof, and the plurality of notches are spaced from each other; the movable member has a plurality of protrusions protruded from an inner surface of the chamber, and the plurality of protrusions are spaced from each other; the protrusions are fitted into the notches respectively to block the friction plate from rotating relative to the movable member.

7. The bicycle rear derailleur of claim 3, wherein the pivot shaft has a thread section; the friction assembly further comprises a nut which is adjustably installed on the thread section, wherein the nut abuts against the friction plate to provide the friction plate a pressure toward the second ratchet gear.

8. The bicycle rear derailleur of claim 1, wherein the elastic member fits around the pivot shaft; an end of the elastic member abuts against an end surface of the first ratchet gear, while another end of the elastic member abuts against the movable member; the elastic member provides an elastic force to the first ratchet gear, keeping the first ratchet gear and the second ratchet gear contacting with each other.

9. The bicycle rear derailleur of claim 1, wherein the pivot shaft has a protruded ring and a circular groove both formed on an outer surface of the pivot shaft; the first ratchet gear is provided between the protruded ring and the circular groove; the second ratchet gear is provided on a side of the circular groove which is away from the protruded ring.

10. The bicycle rear derailleur of claim 9, wherein the restriction assembly comprises a c-shaped ring which is fixed in the circular groove to be abutted against by either the first ratchet gear or the second ratchet gear.

* * * * *

UNITED STATES PATENT AND TRADEMARK OFFICE
CERTIFICATE OF CORRECTION

PATENT NO. : 10,189,542 B2
APPLICATION NO. : 15/378403
DATED : January 29, 2019
INVENTOR(S) : Shan-Lin Wu, Yuan-Ji Lin and Yu-Hung Pan

Page 1 of 1

It is certified that error appears in the above-identified patent and that said Letters Patent is hereby corrected as shown below:

On the Title Page

Item (73) Assignee should read:
LEE CHI ENTERPRISES COMPANY LTD. and THE CYCLE GROUP INC.

Signed and Sealed this
Twenty-second Day of October, 2019

Andrei Iancu
*Director of the United States Patent and Trademark Office*